July 18, 1939.  G. A. SWANSON  2,166,709
CALIPER FOR A GATHERER
Filed July 2, 1937  2 Sheets-Sheet 2
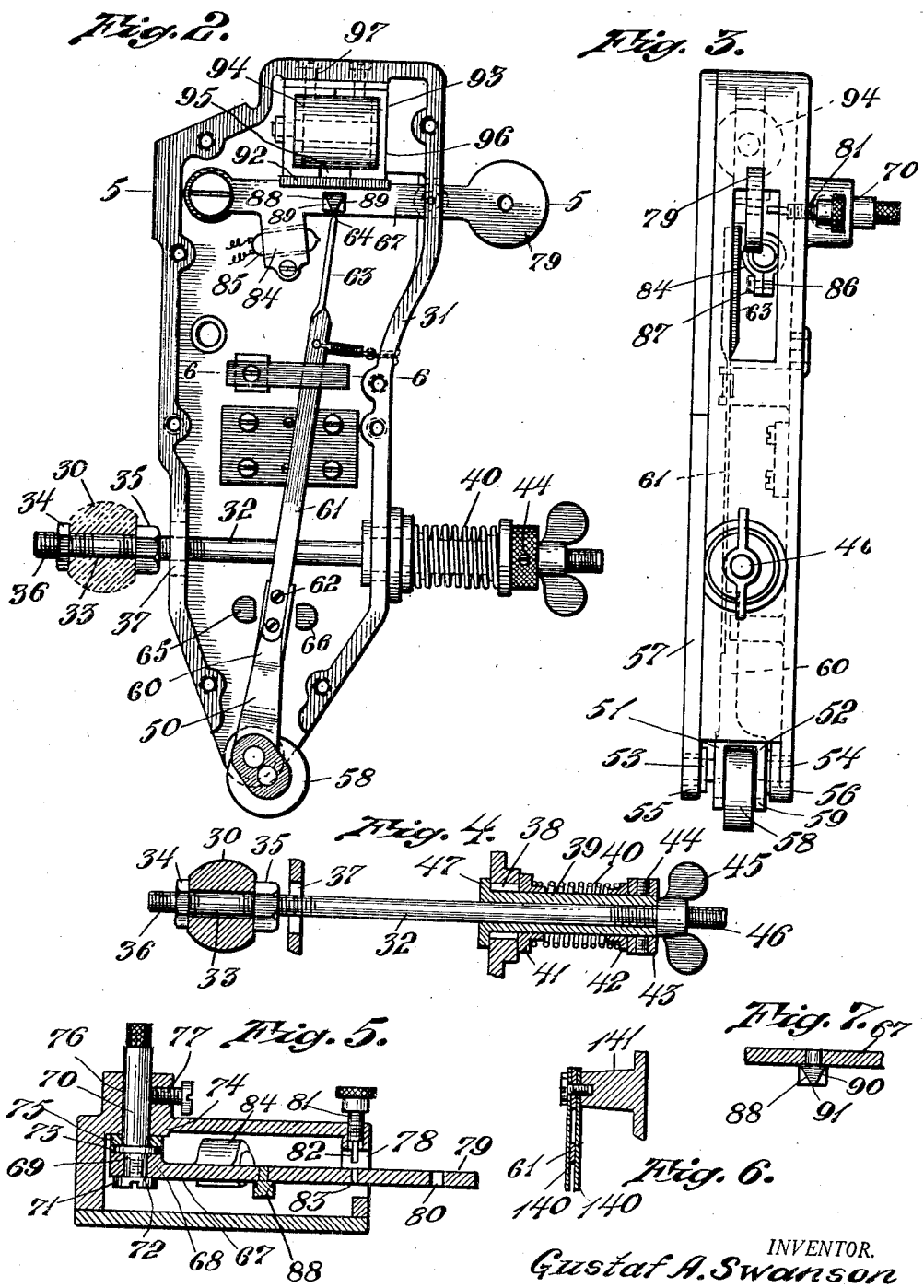
INVENTOR.
Gustaf A. Swanson
BY Barlow & Barlow
ATTORNEYS.

Patented July 18, 1939

2,166,709

UNITED STATES PATENT OFFICE 2,166,709

CALIPER FOR A GATHERER

Gustaf A. Swanson, Warwick, R. I., assignor to The Textile-Finishing Machinery Company, a corporation of Rhode Island Application July 2, 1937, Serial No. 151,578

18 Claims. (Cl. 270—56)

This invention relates to a gatherer which is designed for collecting different signatures to be assembled into book form and is particularly adapted for a rotary type of gatherer. One of the objects of this invention is to provide a device which will detect a mistake in the operation of the machine by reason of the machine gathering from the different piles of signatures either more than one signature or not gathering a signature from a desired pile, and if such a fault occurs to then stop the machine.

Another object of the invention is the provision of such a detecting device which will accurately indicate to the degree of a single thickness of paper, should the signature consist of but a single sheet, a fault with respect to the picking up of the single sheet only so as to detect any error in the same.

Another object of the invention is the provision of an electrically operated detector with the detectors for each box of the machine arranged in series so that should any box fail to supply its proper signature the machine will stop in order that the operator may correct the fault.

Another object of the invention is the detecting of the supply of the proper signature by operation in conjunction with the rotary drum or carrier over which the signatures are supplied.

Another object of the invention is the arrangement of the drum so that it backs up the signature and the thickness of the signature is determined with reference to this back-up drum in order that the detector may operate.

Another object of the invention is the shaping of this drum so as to give a gradual movement up to desired position of the detector that no momentum of the moving parts of the detector will enter into the determination of the accuracy of its operation.

Another object of the invention is the adjustment of the detector so that it may operate effectively whether there be one sheet or a large number of sheets, such as between sixty and seventy sheets, in the signature, all by a simple change readily accessible to the operator in the front of the machine.

With these and other objects in view, the invention consists of certain novel features of construction, as will be more fully described, and particularly pointed out in the appended claims.

In the accompanying drawings:

Fig. 2 is an elevational view of the caliper itself on a somewhat larger scale with the covering plate in the casing removed;

Fig. 3 is an edge view of the structure shown in Fig. 1;

Fig. 4 is a sectional view showing the mounting rod in the body and its relation to a portion of the framework of the gatherer;

Fig. 5 is a sectional view on substantially line 5—5 of Fig. 2;

Fig. 6 is a sectional view on line 6—6 of Fig. 2;

Fig. 7 is a detail illustrating the shape of the abutment carried by the arm for stopping the machine.

Figure 1:
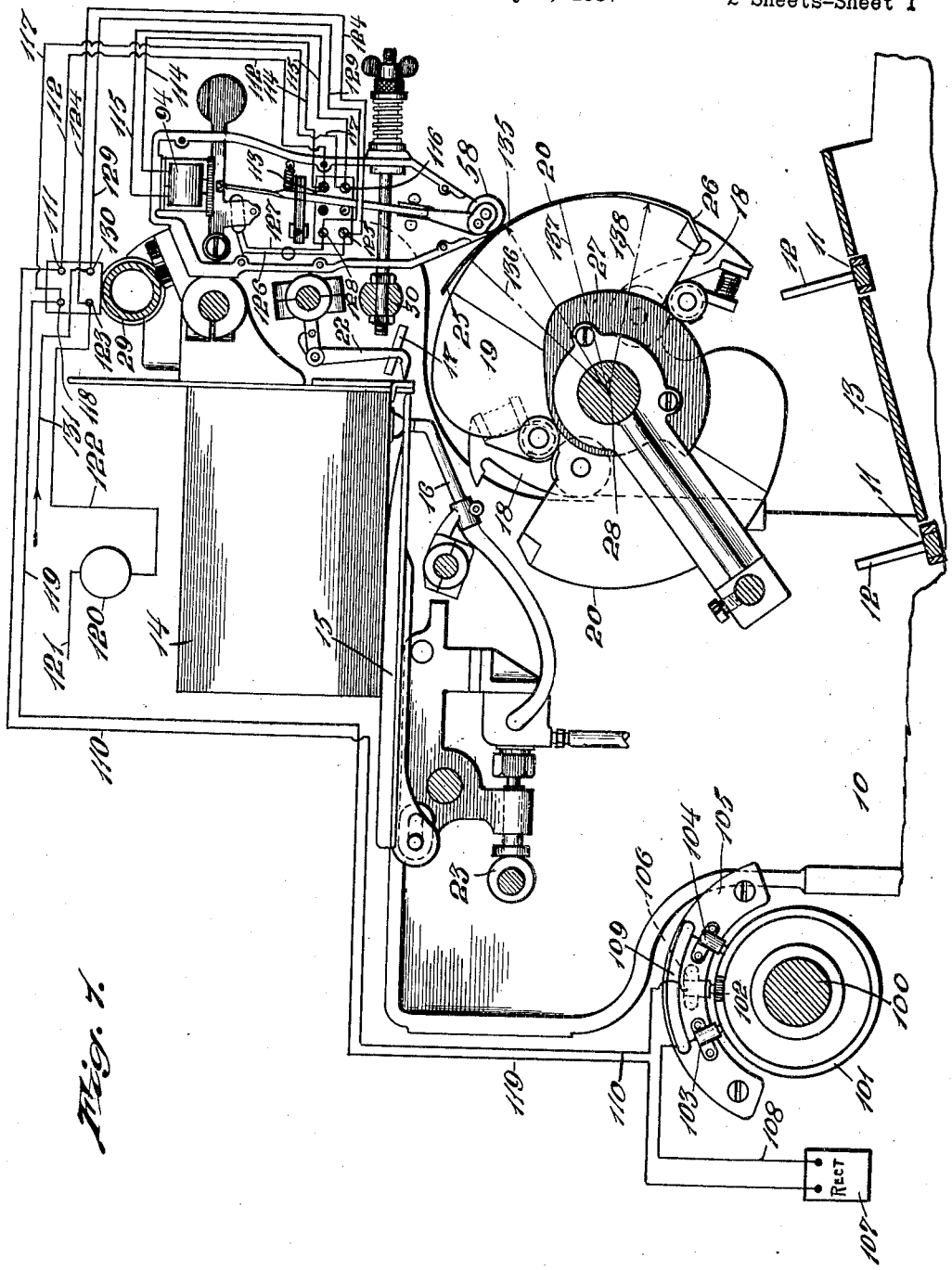
Fig. 1 is a diagrammatic view illustrating the operating parts of the invention in their relative positions.

Machines for gathering signatures which go to make up books usually have a plurality of reciprocating parts which by reason of their movement are limited as to their speed of operation. A rotary gatherer having a plurality of grippers may be used to speed up the operation of the gatherer machine but when greater speed occurs faults often occur in connection with the handling of the signatures due possibly to the static electricity existent in the paper, causing it to stick together, and it is very essential that any fault in the gatherer be accurately and immediately determined and that the machine be stopped if such fault occurs. The ranges of accuracy must be within the dimension of the thickness of a sheet of paper, as frequently one of the boxes of the gatherer will handle a signature having only single sheets, and in order to accomplish this result I have provided a detecting device which cooperates with the drum of the machine upon which the grippers are mounted so that the movement of the detector into desired position is accomplished gradually to avoid any momentum or inertia of the same, and yet is so mechanically accurate as to detect a difference in its movement by reason of there being two instead of one sheet of paper or no sheet of paper where signature having a single sheet of paper is desired, this mechanical movement occurring in such a manner as to permit of the freedom of movement of the device and also the accuracy thereof for detecting within the ranges required, control being by means of an electrical circuit which is actuated by the detector; and the following is a more detailed description of the present embodiment of this invention, illustrating the preferred means by which these advantageous results may be accomplished:

With reference to the drawings, 10 designates a portion of the framework of the gatherer which has a traveling conveyor chain 11 with upstanding signature engaging portions 12 running in spaced relation over a support 13. The signatures 14 are supported on a platform 15 with the usual suction arm 16 for picking off the lower signature which is assisted by the blower nozzle 17 to be gripped by the jaw 18 of the rotary member 19 and positioned over the surface 20 of this rotary member. The remainder of the pack 14 is supported by the hook 22 which is rocked into position beneath the pack as the lower signature is drawn therefrom, suction arm 16 being suitably manipulated by a cam 23 and known mechanism, which is only indicated in this diagrammatic view, as it plays no essential part of the invention. The rotary member 19, however, is somewhat changed in the contour of its surface 20, as will be more fully hereinafter explained. The gripping action of each signature 25 occurs by means of the swinging of its arms 18 to grip the edge of this signature as at 26 and hold it firmly in position, these arms being manipulated by the cam 27 carried by the rotary member 19 so as to cause the arms to move to gripping position at the proper angular position of the rotary member 19 about its axis 28 and to release the arm 18 at the proper time to deposit the signature in the conveyor. Other supporting framework of the gatherer is designated member 29 and rod 30, the latter rod serving as a support for the caliper, which will presently be described.

Should any mistake occur in any one of the boxes of the gatherer, that is, whether it should pick up more than one signature, such as may occur by reason of static electricity existing between signatures, or fail to pick up a signature it must be detected in order that the maximum efficiency of the gatherer be had I accomplish this by measuring the thickness of each signature at a certain definite point in the angular position of the rotary member 19. The measuring instrument I designate as a caliper, which comprises a casing 31 which is mounted upon the framework 30 of the machine by means of a rod 32 extending through an opening 33 in the rod and secured in this position by nuts 34 and 35 having engagement with the threads 36 of the end of this rod 32. This rod 32 extends through a suitable opening 37 in the back side wall of the casing and also through an opening 38 in the front wall of the casing through which also extends a sleeve 39 closely fitting the rod 32 with a spring 40 acting between a collar 41 engaging the front edge wall of the casing and a collar 42 held in position by member 43 having set screws 44 engaging the sleeve 39. The collar 41 and the flange 47 on the end of the sleeve 39 serve to maintain the casing in substantially an upright position. A wing nut 45 engages the threaded end 46 of the rod 32 to maintain the desired tension upon the spring 40. By this means of mounting should an excessive pressure be brought to bear upon the device the spring 41 would yield to prevent breaking of some of the parts.

A feeler member designated generally 50 consists of a casting having a bifurcated or forked portion at its lower end comprising legs 51 and 52 with trunnions 53 and 54 extending outwardly from each of the legs 51 and 52 to be pivotally mounted in bearings 55 and 56 in the lower end of the casing, one bearing being formed in the stock of the body proper, while the other bearing 55 is in the cover plate 57. In the fork or between the legs 51 and 52 a roller 58 is mounted upon an axle 59 which is closely adjacent but offset from the axis of the pivot trunnions 53 and 54 so that engagement with the roller 58 will tend to move the feeler about its pivot 53 and 54 to swing its long arm 60 in a multiple amount to the movement of the roll 58. The long arm 60 is further extended by the sheet stock extension 61 bolted to the arm 60 as at 62 and twisted through 90° as at 63 with its end provided with a knife edge 64 to extend generally upwardly, as illustrated in Fig. 2. Stops 65 and 66 limit the movement of this feeler member, while it is guided in its movement by the arms 140 mounted on part 141 protruding into the casing from the back wall.

An arm 67 has its hub 68 mounted upon the reduced portion 69 of the stud 70. The large head 71 of the screw 72 prevents movement of the arm 67 off of this reduced portion and holds it between the head 71 and the flange 73 of the stud 70 which is spaced from the boss 74 of the casing by a washer 75. This stud may be adjusted through the opening 76 in the casing and held in desired position by the set screw 77 so that the pivotal plane of the arm 67 may be definitely determined. This arm 67 extends outwardly through a slot 78 in the front edge wall of the casing and is enlarged as at 79 and provided with an opening 80 for the mounting of weights thereon if desired. A threaded stud 81 having a reduced end 82 is located in the casing to extend through the opening 83 in the arm 67 to lock it against dropping should it be desired to maintain the caliper inoperative. This arm carries an enlarged portion 84 to suitably mount a mercury switch 85, the same being suitably bound in position by the portion 84 being split as at 86 with a binding screw 87 serving to move the split portions together to firmly and tightly hold the mercury switch 85 in position.

This arm 67 also carries an abutment 88 which is tapered in two directions, that is, looking from the side at the abutment 88, as shown in Fig. 2, the edges 89 converge toward each other downwardly. Also looking at the abutment from the bottom, as shown in Fig. 7, the opposite edges 90 converge toward each other as they progress outwardly from the arm 67 so that the point 91 of the abutment is exceedingly narrow. Thus, by the adjustment of the stud 70 and the location of the arm in a certain desired plane the error or inaccuracy may be arranged, with reference to the knife edge 64, so that the accuracy of the machine may be definitely set and maintained.

An armature 92 is also carried by this arm 67 and an electromagnet 93 consisting of a coil of wire 94 and a core 95 is mounted in a hanger 96 by means of the bolts 97 to hold it in position in the casing. Thus, when this coil is energized the armature 92 which is secured to the arm will be held in raised position. When the current ceases the arm will tend to drop about its pivot point or the stud 70 and the mercury will flow in the mercury switch to break the circuit.

In order that the caliper may operate a shaft 100 is arranged to rotate in time with the rotary member 19. A plurality of commutator rings 101 each having an insulating portion 102 in its extent are mounted on said shaft, one for each caliper. A pair of spaced brushes 103 and 104 electrically connected by the conductor 109 engage each ring and are mounted upon a suitable arc-shaped insulating support 105, while another brush 106 is mounted on the other side of this support and also engages the ring 101. As this ring rotates current will flow through the ring and to the leads connected to the brushes 103 and 104 on one side and 106 on the other at all times except when the lead 106 is over the insulation 102. Direct current is supplied for this purpose through the rectifier 107 which is connected to a suitable source of supply. The circuit may be traced through lead 108 to the brush 103 or 104 through ring 101, brush 106, lead 110, terminal 111, lead 112, terminal 113, lead 114, electromagnet coil 94, lead 115, terminal 116, lead 117, terminal 118, and thence by lead 119 back to the rectifier 107.

The electric circuit in which the mercury switch is located will include the electric motor to operate the gatherer. This motor is designated generally 120 and will take line power from the line 121. The circuit may be traced by lead 122, terminal 123, lead 124, terminal 125, lead 126, mercury switch 85, lead 127, terminal 128, lead 129, terminal 130, and thence by lead 131 back to the line. Thus, should this circuit be interrupted as by the rocking of the mercury switch, the motor for driving the gatherer will stop.

In the operation of this machine, a signature 25 will be picked up by the jaw 18 of the rotary member 19 and drawn over its surface 20. The point at which measurement is to be taken will be some definite angular position of the member 19, the member being in such a position as shown in Fig. 1, and the measuring point is designated 135. This point is on the surface 20 which is on the arc of a circle having an angle which is represented as between the lines 136 and 137, thus all points from the axis to this portion of the surface 20 included in this angle will be of equal radii. However, the radius on line 138 will be substantially less than the radius along the line 137 and the radii of all points on the surface 20 between the radius 138 and 137 will progressively increase or be longer so that I provide a gradual slope on the rotary member 19 whereby the feeler is gradually brought to a desired measuring position, so that no momentum of the feeler member in rocking about its pivot will occur.

The commutator shaft 100 and its ring 101 is so timed that at the point of measuring, which will be during the time roll 58 contacts the arc between the angular lines 136 and 137, the insulating point 102 of the commutator will be opposite brush 106. Thus, at the measuring point no current will flow through the electromagnet 93 and consequently the arm 67 will drop. If the feeler member is positioned a predetermined location indicating the correct thickness of work 25 on the member 19, its knife edge 64 will be immediately below the abutment 88 and the arm will be supported so that after the insulating point 102 is passed and the electromagnet again energized the armature on the arm 67 will be attracted and the same held in raised position and the electromagnet will hold the arm raised until another measurement takes place. If, however, the feeler has not indicated that the correct thickness of signature is present it will be either to one side or the other of the abutment and the abutment will accordingly not engage the knife edge to be supported and the arm will drop, whereupon the mercury switch will be tilted to break the circuit to the gatherer actuating motor 120 and the machine will stop, in order that the operator may correct the error of the signature which has occurred.

Should the signature be particularly thin, such for instance as a single sheet of paper, a very fine adjustment of the arm is desired and the stud 70 will be pulled inwardly its maximum amount such as shown in Fig. 5. If, however, the signatures are relatively thick and a greater tolerance may be had and still determine whether or not a signature is correct, the arm may be pushed further out that a broader abutment surface be presented to be engaged by the knife edge and any slight inaccuracies which are more apt to occur in thicker work such as wrinkles or the like need not cause a stopping of the machine.

It will, of course, be understood that I have illustrated the action of measuring of but a single box of the gatherer. One of these calipers will be presented for each box or each signature and of course the parts which I have described are reproduced for each box of the gatherer throughout the length of the machine.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a gatherer, a rotary member for picking up signatures, means for measuring against said member the thickness of the signature picked up, said member gradually sloping to the measuring point to minimize inaccuracies due to momentum.

2. In a gatherer, a rotary member for picking up signatures, means for measuring against said member the thickness of the signature picked up, said member having an arc at a uniform distance from its axis of rotation against which measurement may be taken and on another arc, gradually sloping to the measuring point to minimize inaccuracies due to momentum.

3. In a gatherer, a rotary member for picking up signatures, means for measuring against said member the thickness of the signature picked up, said member having an arc at a uniform distance from its axis of rotation against which measurement may be taken and another arc, the radius of which from said axis of rotation gradually changes to provide a gradual slope to the measuring point to minimize inaccuracies due to momentum.

4. In a gatherer, a rotary member for picking up signatures, means for measuring against said member the thickness of the signature picked up, said member gradually sloping to the measuring point to minimize inaccuracies due to momentum, there being provided a plurality of measuring points during each revolution of said member.

5. In a gatherer, a rotary member for picking up signatures, means for measuring against said member the thickness of the signature picked up, said member having an arc at a uniform distance from its axis of rotation against which measurement may be taken and another arc, gradually sloping to the measuring point to minimize inaccuracies due to momentum, there being provided a plurality of measuring points during each revolution of said member.

6. In a gatherer, a rotary member having gripping means for picking up signatures, means for measuring against said member the thickness of the signature picked up, and electrically operated means operable in time with said member to determine the angular position of said member at which measurement will be taken.

7. In a gatherer, a rotary member for picking up signatures, means for measuring against said member the thickness of the signature picked up, and means operable in time with said member to determine the angular position of said member at which measurement will be taken, said member gradually sloping to the measuring point to minimize inaccuracies due to momentum.

8. In a gatherer, a rotary member having gripping means for picking up signatures, means for measuring against said member the thickness of the signature picked up, there being provided a plurality of separate and distinct measuring points each revolution of said member, and electrically operated means operable in time with said member to determine the angular positions of said member at which measurements will be taken.

9. A caliper comprising a body, a feeler member rockably mounted therein, an arm gravity urged in operable position and supported by said feeler member when in certain positions, means for retaining said arm in an inoperative position, means to release said arm from said inoperative position at the time measuring is taken, and means responsive to the dropping of said arm beyond a predetermined position to stop the machine.

10. A caliper comprising a body, a feeler member rockably mounted therein, a pivoted arm gravity urged in operative position and supported by said feeler member at a point spaced from said pivot when in certain positions, means for retaining said arm in an inoperative position, means to release said arm from said inoperative position at the time measuring is taken, and means responsive to the dropping of said arm to stop the machine.

11. A caliper comprising a body, a feeler member rockably mounted therein and presenting an upstanding knife edge, an arm gravity urged in operative position and having a narrow abutment to be supported by the knife edge when in certain positions and unsupported by the knife edge when said feeler member is in certain other positions, means for retaining said arm in an inoperative position, means to release said arm from said inoperative position at the time measuring is taken, and means responsive to the dropping of said arm to stop the machine.

12. A caliper comprising a body, a feeler member rockably mounted therein, an arm supported by said feeler member when in certain positions, an electromagnet to support said arm, means to release said arm at the time measuring is taken, and means responsive to the dropping of said arm to stop the machine.

13. A caliper comprising a body, a feeler member rockably mounted therein, an arm supported by said feeler member when in certain positions, an electromagnet to support said arm, means to release the holding up force of said magnet, and means responsive to the dropping of said arm to stop the machine.

14. A caliper comprising a body, a feeler member rockably mounted therein, an arm gravity movable and supported by said feeler member when in certain positions, means for retaining said arm in an inoperative position, means to release said arm from said inoperative position at the time measuring is taken, and means responsive to the dropping of said arm to open a circuit and stop the machine.

15. A caliper comprising a body, a feeler member rockably mounted therein, an arm supported by said feeler member when in certain positions, means to release said arm at the time measuring is taken, and a mercury switch carried by said arm to break a circuit upon dropping of the arm to stop the machine.

16. In a gatherer, a rotary member, a caliper for measuring the thickness of a signature against said member, including a feeler therein, said caliper being yieldingly mounted to give beyond the movement of the feeler if necessary to prevent breaking.

17. In a gatherer, a rotary member, a caliper for measuring the thickness of a signature against said member, including a feeler and an arm to be supported thereby when the measurement is a predetermined correct amount, electromagnetic means for holding the arm in raised position, including a commutator rotatable in time with said member and provided with a point cutting off current to said electromagnetic means when the member is in the angular position for measuring, and means responsive to the dropping of the arm to stop the machine.

18. In a gatherer, a rotary member, a caliper for measuring the thickness of a signature against said member, including a feeler and an arm to be supported thereby when the measurement is a predetermined correct amount, electromagnetic means for holding the arm in raised position, including a commutator rotatable in time with said member and provided with a point cutting off current to said electromagnetic means when the member is in the angular position for measuring, said arm carrying a mercury switch positioned to be closed when the arm is raised and open when the arm drops, and said switch being in a circuit for maintaining said gatherer operating.

GUSTAF A. SWANSON.